(12) United States Patent
Sobel et al.

(10) Patent No.: US 8,614,621 B2
(45) Date of Patent: Dec. 24, 2013

(54) REMOTE CONTROL FOR MULTIMEDIA SYSTEM HAVING TOUCH SENSITIVE PANEL FOR USER ID

(75) Inventors: David A. Sobel, Los Altos, CA (US); Qiang Fu, Irvine, CA (US); Sumant Ranganathan, Saratoga, CA (US); John Walley, Ladera Ranch, CA (US); Pieter Vorenkamp, Laguna Niguel, CA (US); Jeyhan Karaoguz, Irvine, CA (US); Tom W. Kwan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 573 days.

(21) Appl. No.: 12/912,405

(22) Filed: Oct. 26, 2010

(65) Prior Publication Data

US 2011/0115604 A1 May 19, 2011

Related U.S. Application Data

(60) Provisional application No. 61/261,702, filed on Nov. 16, 2009.

(51) Int. Cl.
*G06F 3/041* (2006.01)
*G06F 13/00* (2006.01)
*G06F 7/04* (2006.01)

(52) U.S. Cl.
USPC .................... 340/5.52; 340/5.53; 340/5.82

(58) Field of Classification Search
CPC ............ G06F 7/04; G06F 3/041; G06F 13/00
USPC .............. 340/5.52, 5.53, 5.82; 713/186, 183; 705/75; 382/115, 313; 463/29, 30, 31; 345/173
See application file for complete search history.

(56) References Cited

U.S. PATENT DOCUMENTS

| | | | | |
|---|---|---|---|---|
| 6,028,950 | A * | 2/2000 | Merjanian | 382/126 |
| 6,408,087 | B1 * | 6/2002 | Kramer | 382/124 |
| 6,819,219 | B1 * | 11/2004 | Bolle et al. | 340/5.52 |
| 7,180,401 | B2 * | 2/2007 | Kurtz | 340/5.52 |
| 7,493,495 | B2 * | 2/2009 | Klinger et al. | 713/186 |
| 7,822,232 | B2 * | 10/2010 | Black | 382/116 |
| 7,932,892 | B2 * | 4/2011 | Chen et al. | 345/156 |
| 8,027,518 | B2 * | 9/2011 | Baker et al. | 382/115 |
| 8,172,675 | B2 * | 5/2012 | Migos et al. | 463/29 |
| 8,299,889 | B2 * | 10/2012 | Kumar et al. | 340/3.1 |
| 2006/0250213 | A1 * | 11/2006 | Cain et al. | 340/5.52 |
| 2007/0299670 | A1 * | 12/2007 | Chang | 704/275 |
| 2011/0043475 | A1 * | 2/2011 | Rigazio et al. | 345/173 |

* cited by examiner

*Primary Examiner* — Nam V Nguyen
(74) *Attorney, Agent, or Firm* — Garlick & Markison; Bruce E. Garlick

(57) ABSTRACT

Operating a remote control to identify a user by receiving touch pad input from at least one touch sensitive element of the remote control that has a plurality of touch sensitive elements. The touch pad input corresponds to the user's touch of at least some of the plurality of touch sensitive elements. The touch pad input is at least partially processed by processing circuitry of the remote control and transmitted to a multimedia system console via a communications interface of the remote control for processing of the at least partially processed touch pad input to identify the user via pattern recognition. At least partially processing the touch pad input can be by identifying at least one finger orientation, at least one finger spacing, at least one finger width, a plurality of finger knuckle/joint locations, and/or a plurality of finger lengths based upon the touch pad input.

25 Claims, 13 Drawing Sheets

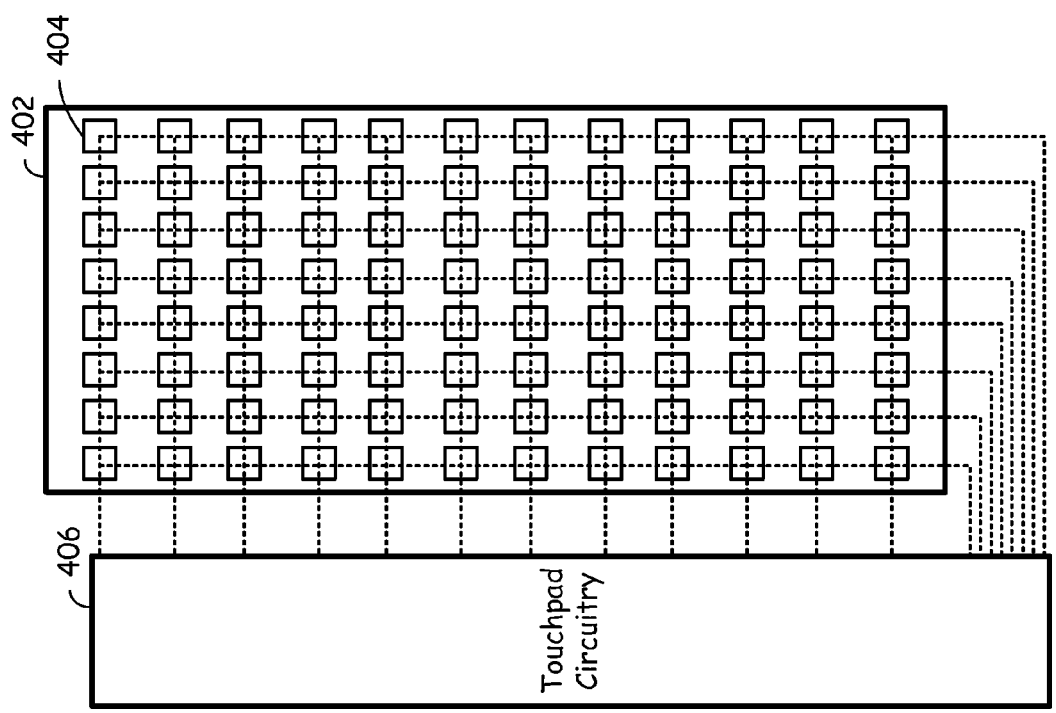

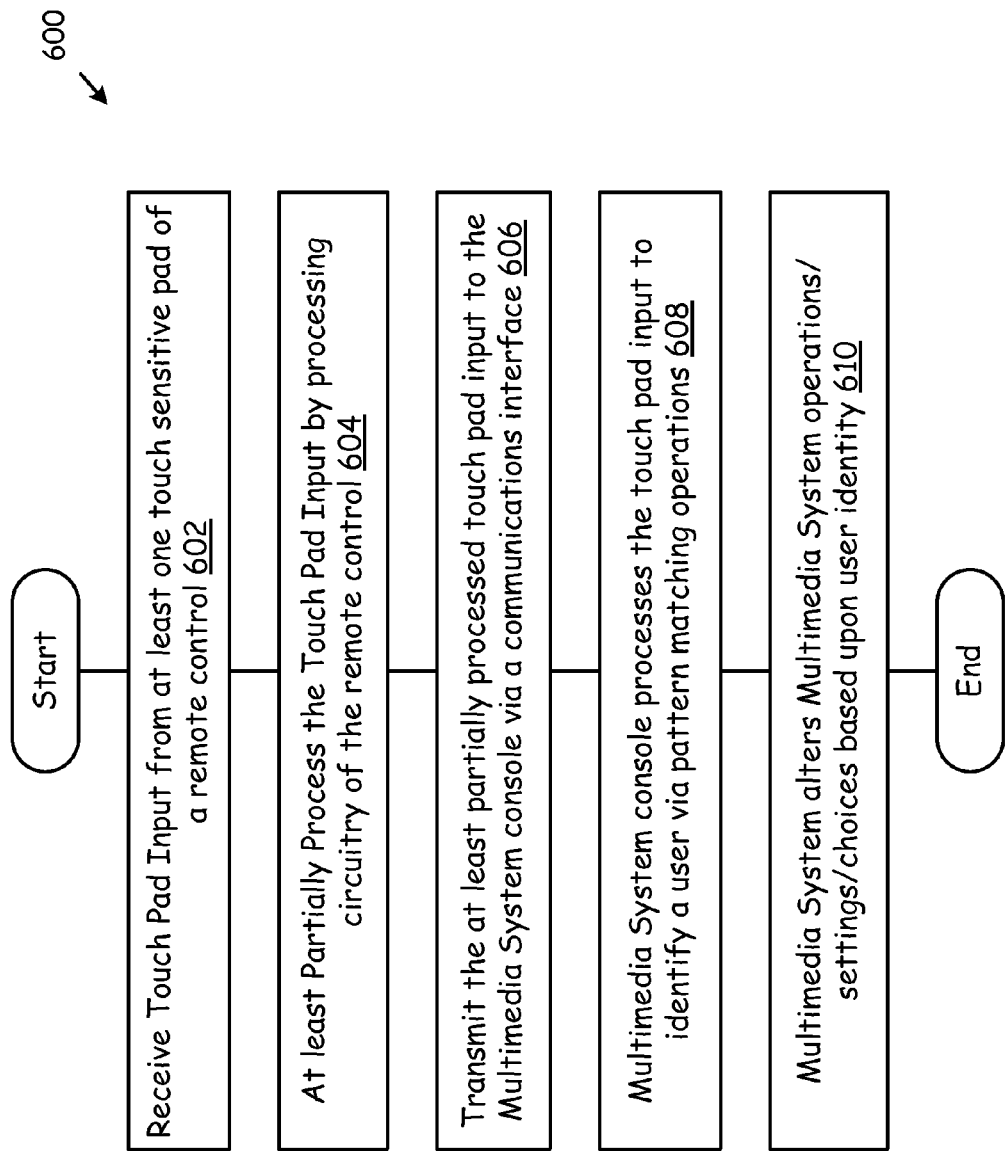

```
┌─────────────────────────────────┐
│ Determine heat transfer         │
│ characteristics of user's       │
│ fingers based upon              │
│ the touch pad input 902         │
└─────────────────────────────────┘
┌─────────────────────────────────┐
│ Use the heat transfer           │
│ characteristics to assist in    │
│ identifying the user            │
│ 904                             │
└─────────────────────────────────┘
```

FIG. 9A

```
┌─────────────────────────────────┐
│ Determine pulse rate            │
│ characteristics of user's       │
│ fingers based upon the          │
│ touch pad input 952             │
└─────────────────────────────────┘
┌─────────────────────────────────┐
│ Use the pulse rate              │
│ characteristics to assist in    │
│ identifying the user 954        │
└─────────────────────────────────┘
```

FIG. 9B

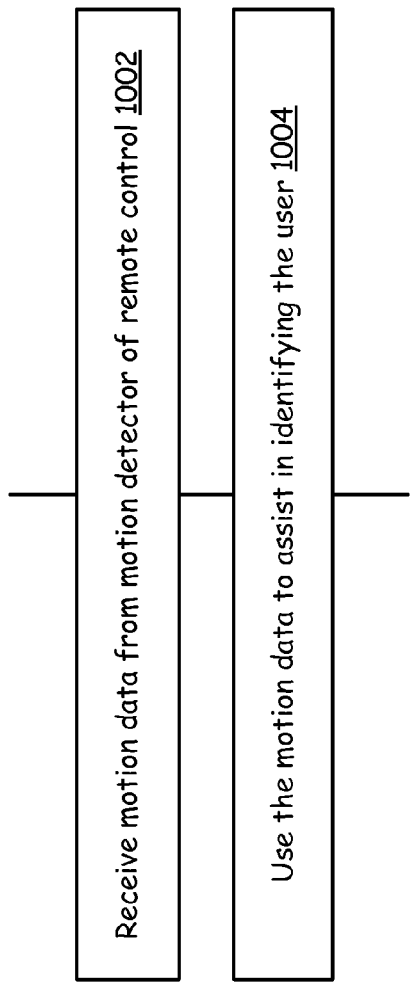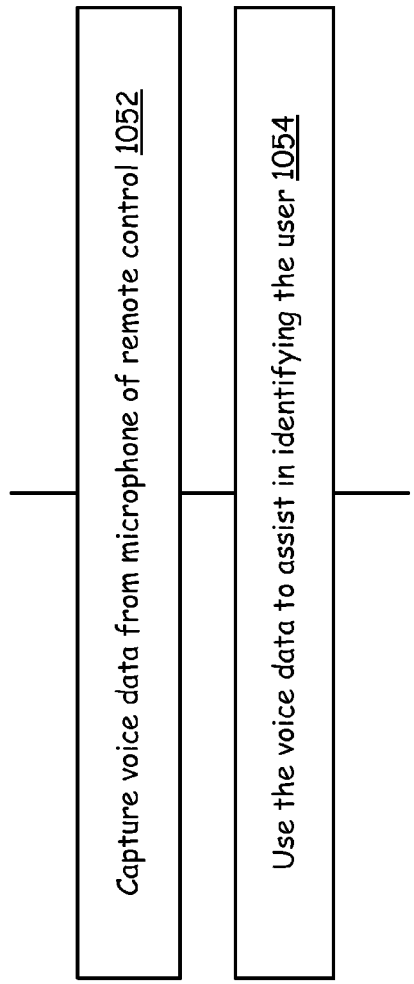

REMOTE CONTROL FOR MULTIMEDIA SYSTEM HAVING TOUCH SENSITIVE PANEL FOR USER ID

CROSS-REFERENCE TO PRIORITY APPLICATION

The present U.S. Utility Patent Application claims priority pursuant to 35 U.S.C. §119(e) to U.S. Provisional Application Ser. No. 61/261,702, entitled "TOUCH PAD USER IDENTIFICATION, GAMING INPUT, AND PREFERENCE INPUT," filed Nov. 16, 2009, pending, which is hereby incorporated herein by reference in its entirety and made part of the present U.S. Utility Patent Application for all purposes.

BACKGROUND OF THE INVENTION

1. Field of the Invention

The present invention relates generally to electronic devices; and more particularly to remote controls used to control other electronic devices.

2. Description of the Related Art

Audio/video multimedia systems include cable boxes, satellite boxes, Digital Subscriber Line (DSL) boxes, and audio/video components such as DVD players, receivers, amplifiers, video monitors, tape players, and other audio/visual entertainment systems, etc., are typically controlled by one or more remote controls. The remote controls allow users to remotely control the operation of the controlled devices, such control including programming selection, volume control, video settings, surround sound settings, and other such operations of multimedia systems. One problem with the remote control of multimedia systems and of the operation of the multimedia systems in general is that the operation of the multimedia systems is generic for all users even though, each user typically has his/her own programming desires, audio setting desires, video setting desires, and other multimedia system preferences.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

BRIEF DESCRIPTION OF THE DRAWINGS

FIG. 4 is a block diagram illustrating a touch pad and touch pad circuitry constructed according to one or more embodiments of the present invention;

FIG. 6 is a flowchart illustrating operations of a remote control and a multimedia system console to identify a user using touch pad input according to one or more embodiments of the present invention;

FIG. 9A is a flowchart illustrating at least partially processing touch pad input to determine heat transfer characteristics of a user's fingers according to one or more embodiments of the present invention;

FIG. 9B is a flowchart illustrating at least partially processing touch pad input to determine pulse rate characteristics of a user's fingers according to one or more embodiments of the present invention;

FIG. 10A is a flowchart illustrating the use of motion data to assist in identifying a user according to one or more embodiments of the present invention;

FIG. 10B is a flowchart illustrating the use of voice data to assist in identifying a user according to one or more embodiments of the present invention;

DETAILED DESCRIPTION

Figure 1:
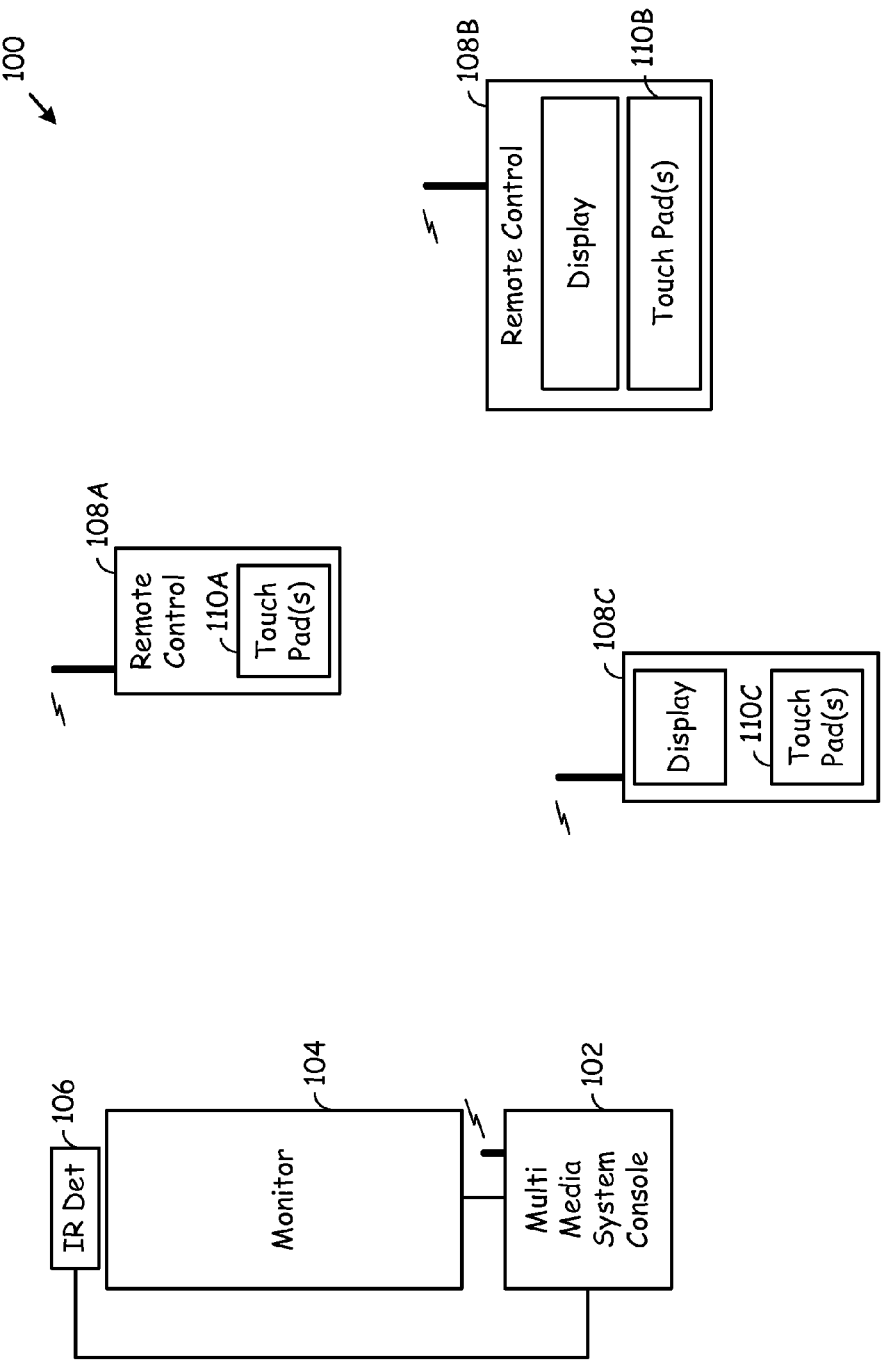
FIG. 1 is a block diagram illustrating a multimedia system constructed according to one or more embodiments of the present invention.

FIG. 1 is a block diagram illustrating a multimedia system constructed according to one or more embodiments of the present invention. The multimedia system 100 includes a multimedia system console 102 that couples to monitor 104 and related multimedia system components such as speakers and audio components such as CD Players, DVD Players, tape decks, receivers, amplifiers, and/or various other multimedia system components. The multimedia system console 102 also couples to an IR detector 106, which is built into the console 102 in some embodiments.

The multimedia system 100 of FIG. 1 further includes a plurality of remote controls 108A, 108B, and 108C. Each of these remote controls 108A, 108B, and 108C includes respective touch pads 110A, 110B, and 110C. These touch pads 110A, 110B, and 110C are used to identify a particular user of the remote control 108A, 108B, or 108C based upon touch pad input as measured at a plurality of touch sensitive elements of the touch pads. Touch pad input may be capacitance, inductance, RF propagation characteristics, or a combination of these as measured at the touch sensitive elements of the touch pads. As will be further described herein, the touch pads may be employed to identify users based upon relative characteristics of the users' fingers or hands as they pickup and hold the remote control. Alternatively, the remote controls 108A, 108B, and/or 108C may capture finger print patterns at the touch pads. The information regarding the user that is received via touch pads 110A, 110B, and/or 110C may be relayed to multimedia system console 102, which uses this information to identify the user and to alter operations of the multimedia system 100 based upon the user ID. Alternately, one or more of the remote controls 108A, 108B, and 108C may perform user ID operations based upon input and alter its/their operation based upon the identified user. Further, one or more of the remote controls 108A, 108B, and 108C may relay the identified user information to the multimedia system console 102 for use thereby.

The remote controls 108A, 108B, and/or 108C and/or the multimedia system console 102 must be trained to identify particular users. The training may be direct training via a training system implemented on the multimedia system console 102 that uses the monitor 104 and/or other components of the multimedia system 100. For example, in one embodiment, the identification of the user and customization of the multimedia system 100 may be done completely without input from the user. In such case, the remote controls 108A, 108B, or 108C capture information respective to each user and relay the information to the multimedia system console 102. Then, over time, the multimedia system console 102 learns how each user uses the multimedia system 100. The system 100 then automatically configures itself based upon an identified user.

A second embodiment requires partial user input with the multimedia system 100 requesting information from each user when they are not yet identified. In an initial operation, the multimedia system 100 requests the user to enter his/her user ID and from that point forward establishes a database of user characteristics for the identified user based upon information captured via the touch pad of a remote control and other user characteristics that are based upon a user's programming selection, time of day/day of week usage habits, and channel surfing habits. The additional information that is captured by the multimedia system 100 allows the system to more easily recognize the user based upon touch pad input that is received at a later time by the remote control.

A third embodiment of the multimedia system 100 requests the user to identify himself or herself and then to hold the remote control for user identification training. In such case, the multimedia system 100 captures touch pad input that is unique to the user. Then, over a few iterations for this training, the multimedia system 100 has a basis for which to subsequently identify the user using subsequently captured touch pad input collected. Note that any of these training operations may be performed solely by the remote controls 108A, 108B, and 108C, in cooperation with other multimedia system 100 components in some embodiments.

Figure 2:
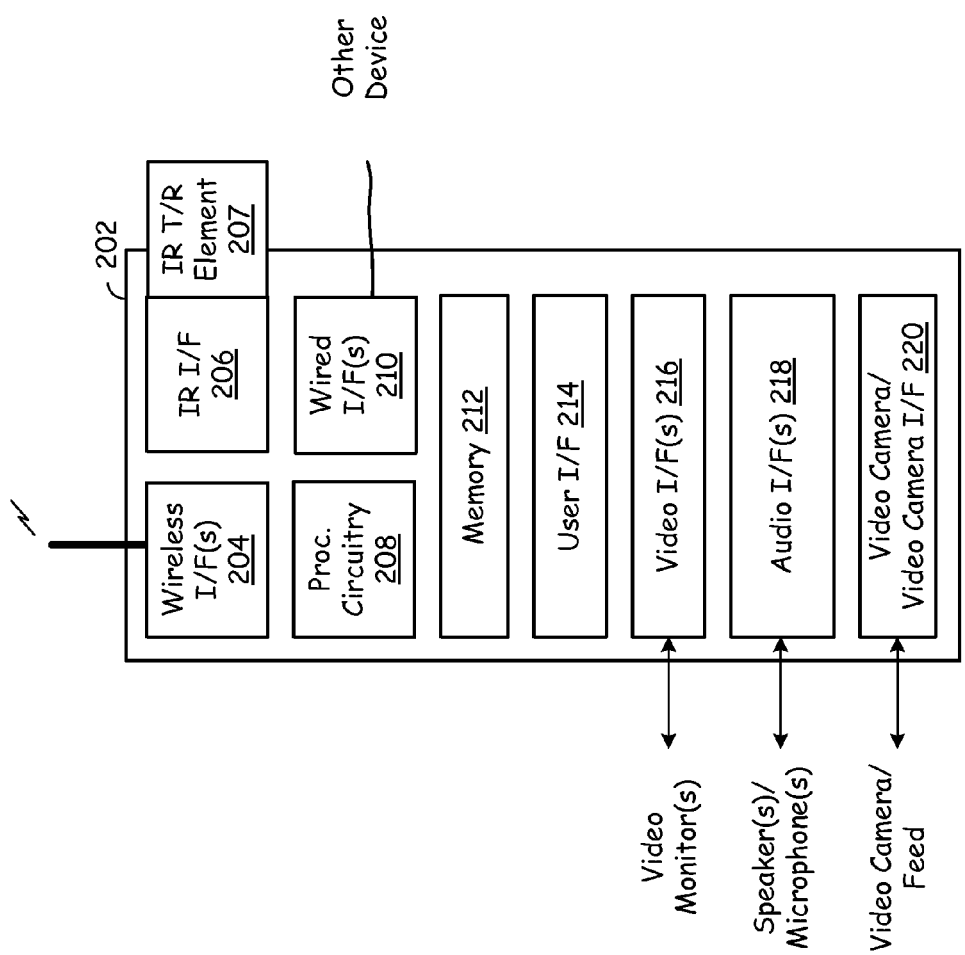
FIG. 2 is a block diagram illustrating a multimedia system console constructed according to one or more embodiments of the present invention.

FIG. 2 is a block diagram illustrating a multimedia system console constructed according to one or more embodiments of the present invention. The multimedia system console 202 of FIG. 2 (102 of FIG. 1) includes a wireless interface 204, an infrared interface 206, an IR Transmit/Receive element 207, processing circuitry 208, one or more wired interfaces 210, and memory 212. The multimedia system console 202 typically would also include a user interface 214, at least one video interface 216, at least one audio interface 218, and may include a video camera/video camera interface 220. The wireless interfaces 204 support wireless communications with at least the remote controls 108A, 108B, and 108C described with reference to FIG. 1 and with other wirelessly enabled devices. This wireless interface may be consistent with a Bluetooth interface, a wireless local area network (WLAN) interface, or another type of wireless communication interface that supports communications between the multimedia system console 202 and remote controls/other devices. Further, the wireless interface 204 may support communications with a WLAN router or access point, a cellular infrastructure, a satellite communications network, or another type of wireless communications systems.

The IR interface 206 couples to the IR transmit/receive element 207 and supports IR communications with remote controls 108A, 108B, and 108C as shown in FIG. 1. The IR communications between the multimedia system console 202 and the remote controls 108A, 108B, and 108C may support an industry standard or proprietary communications protocol. The processing circuitry 208 may include one or more of a system processor, a digital signal processor, a processing module, dedicated hardware, application specific integrated circuit, or other circuitry that is capable of executing software instructions and for processing data. The memory 212 may be RAM, ROM, FLASH RAM, FLASH ROM, an optical memory, magnetic memory, or other types of memory that is capable of storing data and/or instructions in allowing processing circuitry to access same. The wired interfaces 210 may include a USB interface, a fire wire interface, a serial interface, a parallel interface, an optical interface, or another type of interface supported by a media that is copper, metal, or optical.

The user interface 214 may include keypad, video display, cursor control, touch pad, or other type of interface that allows a user to interface with the multimedia system console 202. The video interface 216 couples the multimedia system console 202 to one or more video monitors to provide display for the multimedia system environment supported by the multimedia system console 202. The communications link between the video interface 216 and the video monitor(s) may be an HDMI interface, a composite video interface, component video interface, an S-video interface, or another type of video interface supported by both the video monitor and the multimedia system console 202. The audio interface 218 couples the multimedia system console 212 to speakers and/or microphones for audio content delivery and receipt. The video camera/video camera interface 202 may include an onboard video camera or may couple the multimedia system console 202 to an external video camera. The external video camera may be used to provide input or other types of information that the multimedia system console 202 uses within its operation to produce an entertainment system environment.

Figure 3:
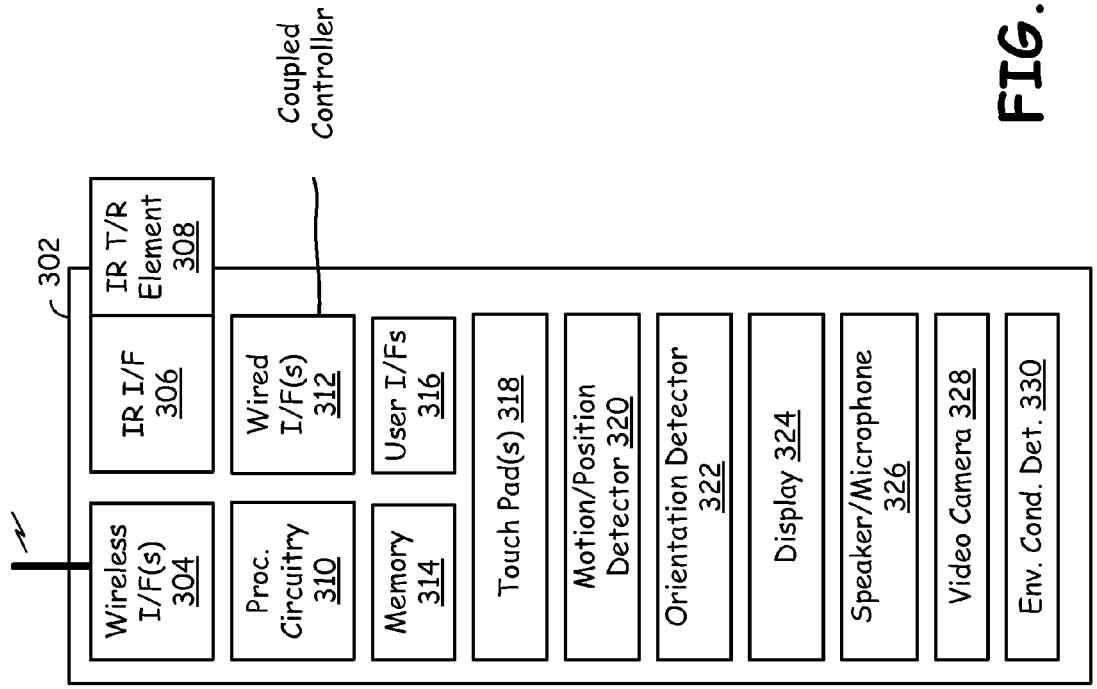
FIG. 3 is a block diagram illustrating a multimedia system remote control constructed according to one or more embodiments of the present invention.

FIG. 3 is a block diagram illustrating a multimedia system remote control constructed according to one or more embodiments of the present invention. The remote control 302 includes one or more wireless interfaces 304, an IR interface 306 that includes an IR transmit/receive element 308, processing circuitry 310, wired interface(s) 312, memory 314, and user interface(s) 316. These particular components of the remote control 302 may be similar to the like named components of the multimedia system console 202 illustrated in FIG. 2 and described with reference thereto. However, in other embodiments, these like named components may have differing construct/functionality, e.g., smaller memory, less processing capability, lower power wireless interfaces, etc. Thus, commonly named components will not be described further herein as they have been previously described with reference to FIG. 2.

The remote control 302 includes one or more touch pad(s) 318, motion/position detector 320, orientation detector 322, display 324, speaker/microphone 326, and a video camera 328. The remote control may also include other components such as one or more environmental conditions detectors 330 that are used to sense environmental conditions such as temperature, humidity, and other environmental conditions. The structure and operations of the touch pads 318 will be described further herein with reference to subsequent FIGs. The motion/position detector 320 detects motion/acceleration of the remote control 302. Detection of such motion/acceleration may be performed in conjunction with the remote control, using a GPS system, using an accelerometer or gyrator of the remote control 302 and/or using external components to determine motion/acceleration of the remote control. The motion/position detector 320 may also determine position of the remote control. Motion, acceleration, and position of the remote control 302 may be provided to a servicing multimedia system console as an input.

The display 324 of the remote control 302 may have a relatively small size or relatively large size that presents information to a user and that allows the user to respond accordingly. The speaker/microphone 326 may receive audio input and provide audio output to a user of the remote control 302. Audio input captured by the microphone may be used in conjunction with touch pad 318 input for user identification. Video camera 328 of the remote control may be used to determine a location of the remote control and/or may be used to provide additional input for use in identifying a user.

According to one particular aspect of the multimedia system of FIG. 1, the touch pad(s) 318 of the remote control 302 (and/or multimedia system console) may be capacitive, inductive, or RF based. With regard to inputs received via the touch pad 318 of the remote control 302, the raw data received by a touch pad 318 of the remote control 302 may be fully communicated to the multimedia system console 202. Alternatively, information captured via the touch pad(s) 318 of the remote control may be processed by the processing circuitry 310 of the remote control 302 (or other processing circuitry such as the touch pad processing circuitry shown in FIG. 4, which may be different or the same as the processing circuitry 310) prior to communicating such information to the multimedia system console 102 of FIG. 1. Such processing may be full or partial to determine whether and what data to upload to the multimedia system console 102/202.

The data received from one or more touch pads according to the present invention may be used to identify a user of the multimedia system. Data captured by one or more touch sensitive elements or panels is used to distinguish a user from a plurality of users based upon finger width, finger length, finger spacing, knuckle joint location, finger angle, and other characteristics of a user's hand/fingers that is used to grasp the remote control. Identification of the user is done based upon pattern matching using various techniques, some of which are known. Further, the touch pad and related operations supported by the structure(s) of the present invention may identify users based upon the heat transfer characteristics, their pulse rate characteristics, and other characteristics that would be gathered via input at a touch pad. User identification operations may be performed solely by the remote control 302 or by the remote control 302 in conjunction with other components of the multimedia system.

In establishing user characteristic/user ID correspondence, there may be multiple levels of training. With one level of training, a user sets-up his or her identity within the multimedia system. Then, a first operation establishes correspondence between touch pad characteristics and the user. The multimedia system may query a user to confirm that he or she is currently using the remote control with this operation by receiving input from a touch pad and then confirming that the particular user identity is correct. Further, the training may proceed so that it is initially intrusive and asks a number of questions of the user but then decreases its intrusions when matching stored users with touch pad input characteristics.

Alternatively, the remote control may simply automatically relate user characteristics as received from a touch pad with multimedia system characteristics or settings of the multimedia system. Generally, the user identification learning process should be as automatic as possible so as not to be burdensome to users of the system. Further, the user identification system of the present invention should delete inactive users from the database so that they are not considered as candidates when determining whether or not a current user is one of a plurality of registered or prior users of a system.

According to another aspect of the present invention, the touch pad input that is used to identify the user may be used in conjunction with auxiliary information to identify a particular user. This auxiliary information may include multimedia system usage levels, programming preference selections, audio settings, video settings, relative position with respect to a monitor, channel surfing selections, time of day at which multimedia system is performed, day of week at which multimedia system is used, gyrator input (accelerometer input), and/or additional auxiliary information. Based upon particular multimedia system selections and data input received from a touch pad, the auxiliary information of multimedia system selection may be used to assist in identifying the user that is currently using the multimedia system. Moreover, a particular user may only use the multimedia system during certain times of the day or days of the week and such information is further used to determine identity of the user of the multimedia system.

Once a user is identified, the user's custom multimedia system settings are enacted. For example, a particular user is identified and this user's multimedia system audio settings, video settings, programming selections, and other preferences that have been previously set for the multimedia system or otherwise matched with the user are automatically enacted. These settings may be for the remote control, the multimedia console, a Set Top Box (STB), and/or for other components of the multimedia system. In another example of operations, once a user is identified, a sequence of touches on the touch pad may alter some multimedia system operation or multimedia system selection operations. These particular custom operations are based upon the fact that a particular user is identified as currently operating the multimedia system. Further, menus and other user input selections may be altered after a user is identified. For example, the user may have previously indicated that he or she only wants to employ certain multimedia system options. Once that user is identified then the multimedia system only gives that particular user the option of selecting from preset multimedia system options. The user may have customized the interface of the multimedia system previously and, when the user is identified, the customized user interface of the multimedia system is enacted.

FIG. 4 is a block diagram illustrating a touch pad and touch pad circuitry constructed according to one or more embodiments of the present invention. A touch pad 402 includes a plurality of touch sensitive elements 404 each of which corresponds to a particular location of the touch pad 402. With the embodiment of FIG. 4, the touch pad includes an array of touch sensitive elements 404, each of which may be a particular capacitively coupled location, inductively coupled location, or a radio frequency (RF) touch sensitive element. Touch pad circuitry 406 couples via a grid structure to the plurality of touch sensitive elements 404 to sense the particular capacitance, inductance, or RF characteristics at each of the touch sensitive elements 404.

Touch pad circuitry 406 scans the plurality of touch sensitive elements 404 via access of particular row-column combinations at particular times. The frequency or voltage at which the touch pad circuitry 406 scans the plurality of touch sensitive elements 404 may be altered over time. Choosing the scanning frequency or scanning voltage may be based upon a particular operational use of the touch pad. For example, at some points in time the manner in which the touch pad is scanned will change based upon a particular operation of the multimedia system with which the touch pad functions, e.g., a first scanning frequency/scanning voltage may be employed for user identification while a second scanning frequency/scanning voltage may be employed for receiving multimedia system input.

The scanning done by the touch pad circuitry 406 of the plurality of touch sensitive elements may be made using a spread spectrum scanning frequency technique. Such technique may be employed to more efficiently capture information from the touch pad 402 at the various touch sensitive elements 404 or to determine which particular scanning frequencies are more successful than others in capturing input information.

Further, the scanning of each row and column corresponding to a particular touch sensitive element 404 may be altered based upon a detected capacitance (inductance/RF propagation) at the location. For example, one particular touch sensitive element 404 may have a fixed capacitance that does not vary over time. Such fixed capacitance may indicate that the particular touch sensitive element 404 is inoperable or that it receives no discernable input. In such case, by not scanning the particular touch sensitive element, other touch sensitive elements may be more frequently scanned or energy may be saved by not scanning all touch sensitive elements.

According to another aspect of the present invention, some portions of the touch pad 402 may be disabled while others are enabled at differing points in time. Enablement of some touch sensitive elements 404 and not others may be based upon a custom configuration of the touch pad 402 for a particular input function provided.

The touch pad 402 may also be calibrated by the touch pad circuitry 406 based upon the environmental factors such as temperature, humidity, and surrounding noise from the capacitance, inductance, or RF. Calibration of the touch pad 402 allows the touch pad to be more efficient in receiving touch pad input for user identification and/or for other input purposes. The calibration of the touch pad 402 by the touch pad circuitry 406 may be initiated at particular points in time. The touch pad circuitry 406 may simply initiate calibration of the touch pad 402 upon the expiration of the timer such that the touch pad is calibrated at particular regular time intervals. Alternatively, the touch pad 402 may be calibrated after a period of inactivity when that the touch pad circuitry 406 determines that no input is present on the touch pad 402. With other operations or embodiments, the touch pad 402 may be calibrated by the touch pad circuitry 406 using other input criteria as well.

Figure 5B:
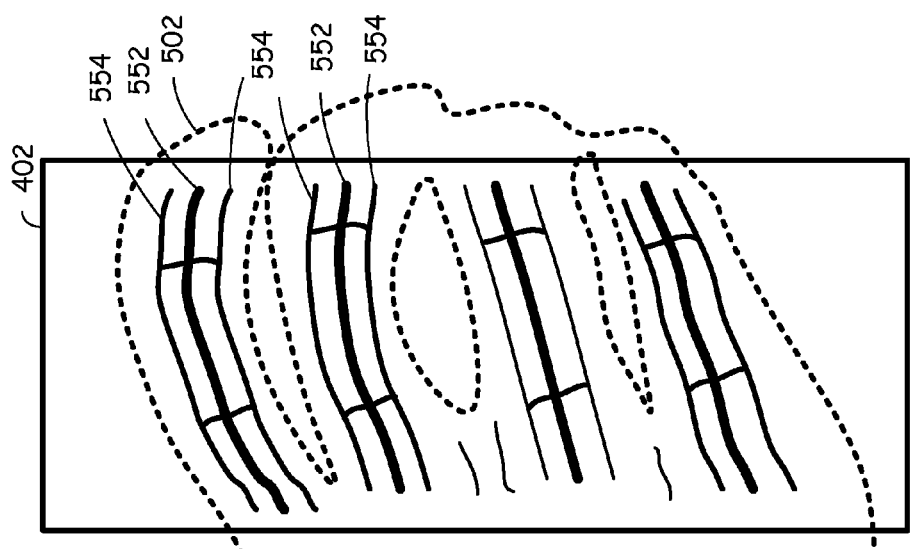
FIG. 5B is a diagram illustrating the manner in which a user's hand upon the touch pad and produce a particular pattern of capacitance upon the touch sensitive elements of the touch pad.
Figure 5A:
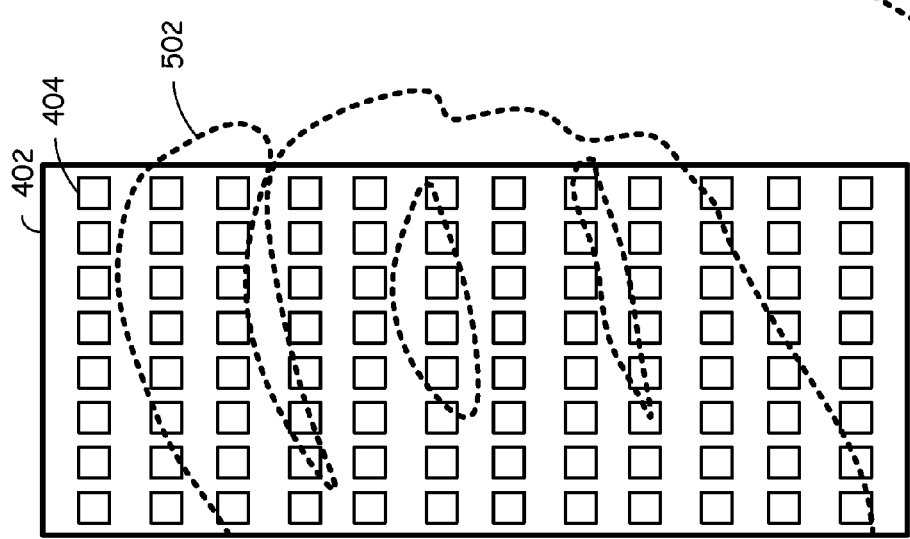
FIG. 5A is a diagram illustrating how a user's hand may overlay a touch pad according to one or more embodiments of the present invention.

FIG. 5A is a diagram illustrating how a user's hand may overlay a touch pad according to one or more embodiments of the present invention. The touch pad 402 has a plurality of touch sensitive elements 404 and is mounted upon a remote control so that it is adjacent a user's hand when the user holds the device. The outline 502 of users hand is shown as overlaying the touch pad 402 and the plurality of touch sensitive elements 404.

FIG. 5B is a diagram illustrating the manner in which a user's hand upon the touch pad may produce a particular pattern of capacitance (inductance/RF propagation) upon the touch pad. A relative capacitance, inductance, or RF propagation pattern of the user's hand 502 is shown on touch pad 402. The depiction in FIG. 5B is illustrated in general only of relative capacitance at each of the user's finger location positions upon the touch pad 402. For example, where the user's fingers touch physically the touch pad 402, stronger capacitance lines 552 and 554 are shown. Where the user's fingers overlay the touch pad 402, lesser capacitance, inductance, or RF propagation characteristic lines 554 are shown. While other capacitance lines on the touch pad 402 are not shown in FIG. 5B are numbered, the various capacitance lines would be present for the other fingers as well. The capacitance pattern of the user's hand 502 upon the touch pad 402 is a signature of a particular user. The size of the users' hands, the positions of their knuckles, the relative angle at which they grip the remote control will vary from user to user. The characteristics measured at each touch sensitive element 404 enables the remote control to identify a user via the touch pad 402.

FIG. 6 is a flowchart illustrating operations of a remote control and a multimedia system console to identify a user using touch pad input according to one or more embodiments of the present invention. Operations 600 begin when touch pad input is received from at least one touch sensitive element of a remote control, step 602. The touch pad input has components from a plurality of touch sensitive elements of the touch pad of the remote control. The touch pad input is at least partially processed by processing circuitry of the remote control, step 604. The at least partially processed touch pad input is then transmitted to the multimedia system console via a communications interface, step 606. The multimedia system console processes the touch pad input to identify a user via pattern matching operations, step 608. The multimedia system console may then alter multimedia system operations/settings/choices based upon user identity, step 610. Alternation of settings at step 610 may include the multimedia console transmitting a settings alteration direction to the remote control and the remote control altering its settings based upon the settings alteration direction.

The pattern recognition used at step 608 may be based upon user finger characteristics, hand characteristics, or a combination of these. These characteristics and processing employed to determine these characteristics are described further herein with reference to FIG. 8. In another embodiment, heat transfer characteristics of a user's fingers are also determined based upon touch pad input and the heat transfer characteristics are used to assist in identifying a user. Pulse rate characteristics of a user's fingers can be determined based upon the touch pad input and can be used to assist in identifying a user. Motion data can be received from a motion detector of the remote control via the communications interface and can be used to assist in identifying a user. Voice data can be received from a microphone of the remote control via the communications interface and can be used to assist in identifying a user.

Figure 7:
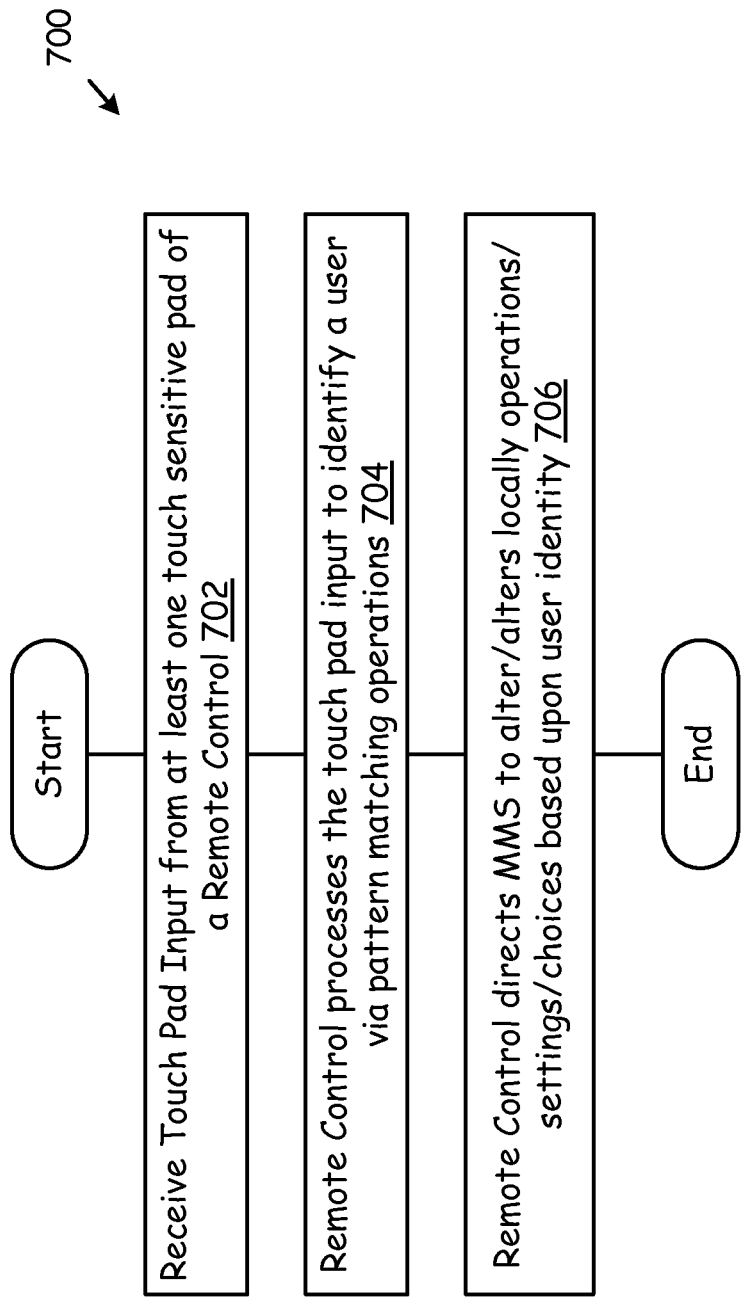
FIG. 7 is a flowchart illustrating operations of a remote control to identify a user using touch pad input and to alter multimedia system operations/settings/choices according to one or more embodiments of the present invention.

FIG. 7 is a flowchart illustrating operations of a remote control to identify a user using touch pad input and to alter multimedia system operations/settings/choices according to one or more embodiments of the present invention. Operations 700 begin when touch pad input is received from at least one touch sensitive element of a remote control, step 702. The remote control processes the touch pad input to identify a user via pattern matching operations, step 704. The remote control alters multimedia system operations/setting/choices based upon user identity, step 706, and the process ends. In FIG. 7, all operations are performed by a single device, the remote control, as contrasted to the operations of FIG. 6. However, the remote control, after identifying the user, may send directions to the multimedia system console to alter other multimedia system settings. The reader should understand that with the process described herein, various processes described may be fully performed by the remote control, fully performed by the multimedia system console, or may be performed by a combination of the remote control and multimedia system processor.

Figure 8:
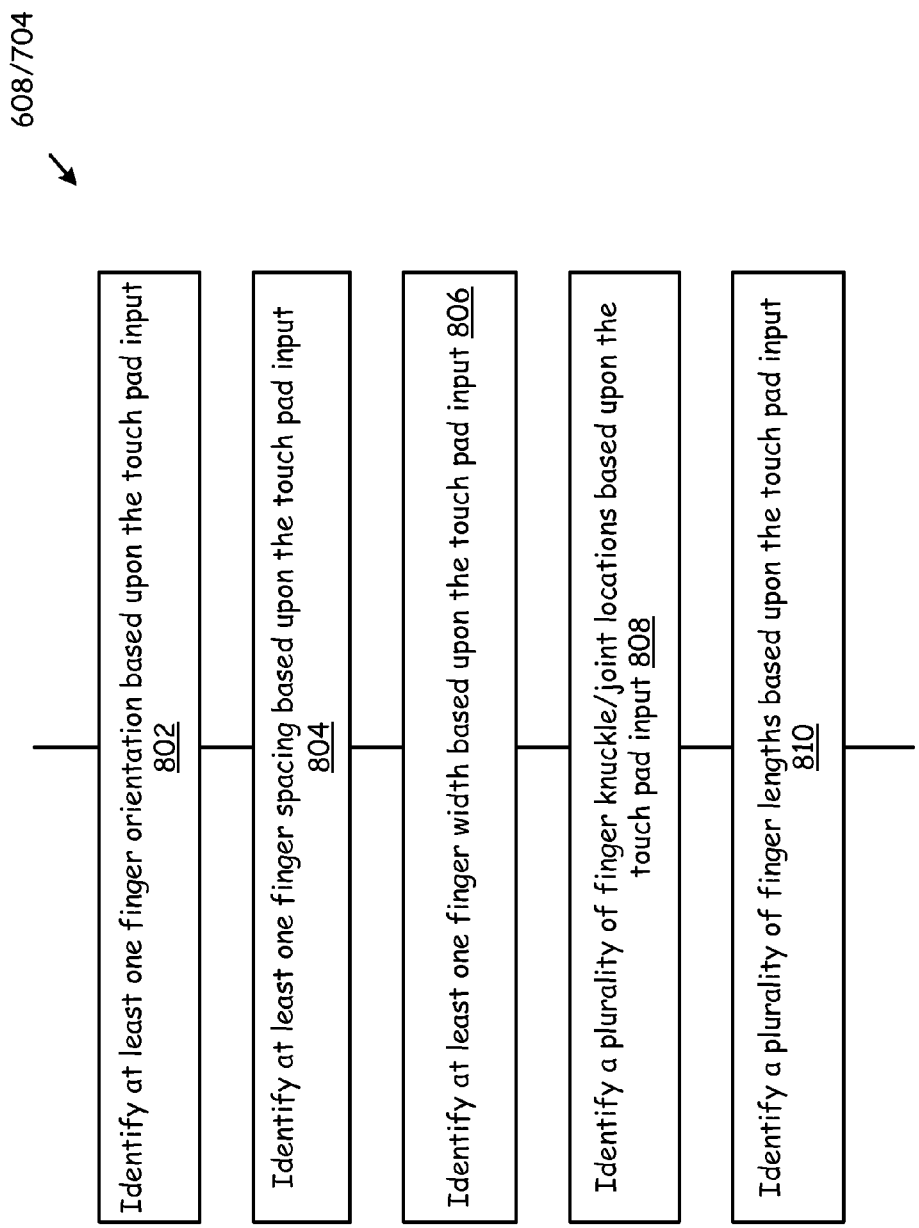
FIG. 8 is a flowchart illustrating at least partially processing touch pad input by processing circuitry of a remote control for use to identify a user based upon finger/hand characteristics according to one or more embodiments of the present invention.

FIG. 8 is a flowchart illustrating at least partially processing touch pad input by processing circuitry of a remote control for use to identify a user based upon finger/hand characteristics according to one or more embodiments of the present invention. At least partially processing the touch pad input by processing circuitry of the remote control can be performed by one or more of the following: identifying at least one finger orientation based upon the touch pad input, step 802; identifying at least one finger spacing based upon the touch pad input, step 804; identifying at least one finger width based upon the touch pad input, step 806; identifying a plurality of finger knuckle/joint locations based upon the touch pad input, step 808; identifying a plurality of finger lengths based upon the touch pad input, step 810.

User finger characteristics, e.g., at least one finger orientation, at least one finger spacing, at least one finger width, a plurality of finger knuckle/joint locations, and a plurality of finger lengths, may be determined by either or both of the multimedia system console and the remote control. The touch pad input can be processed by either/both the multimedia system console and the remote control to determine these characteristics. Once, determined, these characteristics are compared to stored data of the same type for stored users for identification. Upon initial setup, these characteristics are stored for a particular user.

FIG. 9A is a flowchart illustrating at least partially processing touch pad input to determine heat transfer characteristics of a user's fingers according to one or more embodiments of the present invention. The touch pad input is at least partially processed by processing circuitry of the remote control. Heat transfer characteristics of a user's fingers are determined based upon the touch pad input, step 902. The heat transfer characteristics are used to assist in identifying the user, step 904. These heat transfer characteristics can be used in conjunction with user finger characteristics to identify the user.

FIG. 9B is a flowchart illustrating at least partially processing touch pad input to determine pulse rate characteristics of a user's fingers according to one or more embodiments of the present invention. The touch pad input is at least partially processed by processing circuitry of the remote control. Pulse rate characteristics of a user's fingers are determined based upon the touch pad input, step 952. The pulse rate characteristics are used to assist in identifying the user, step 954. These pulse rate characteristics can be used in conjunction with user finger characteristics to identify the user.

FIG. 10A is a flowchart illustrating the use of motion data to assist in identifying a user according to one or more embodiments of the present invention. Motion data is received from a motion detector of the remote control, step 1002. The motion detector may be an accelerometer or another component of the remote control that is capable of determining the motion of the remote control with respect to an inertial rest state, with respect to the immediate surroundings, with respect to the earth, or with respect to another reference frame. The motion data is transmitted to the multimedia system console via the communications interface of the remote control for processing to assist in identifying the user, step 1004. The motion data can be used in conjunction with user finger characteristics to identify the user.

FIG. 10B is a flowchart illustrating the use of voice data to assist in identifying a user according to one or more embodiments of the present invention. Voice data is received from a microphone of the remote control, step 1052. The voice data is transmitted to the multimedia system console via the communications interface of the remote control for processing to assist in identifying the user, step 1054. The voice data can be used in conjunction with user finger characteristics to identify the user. The voice data may be processed by the remote control prior to transmission to the multimedia system console. Alternately, the voice data may be captured by the multimedia system console and used by the multimedia system console to identify a user to augment other data used to identify the user, e.g., finger pattern, hand pattern, etc.

Figure 11:
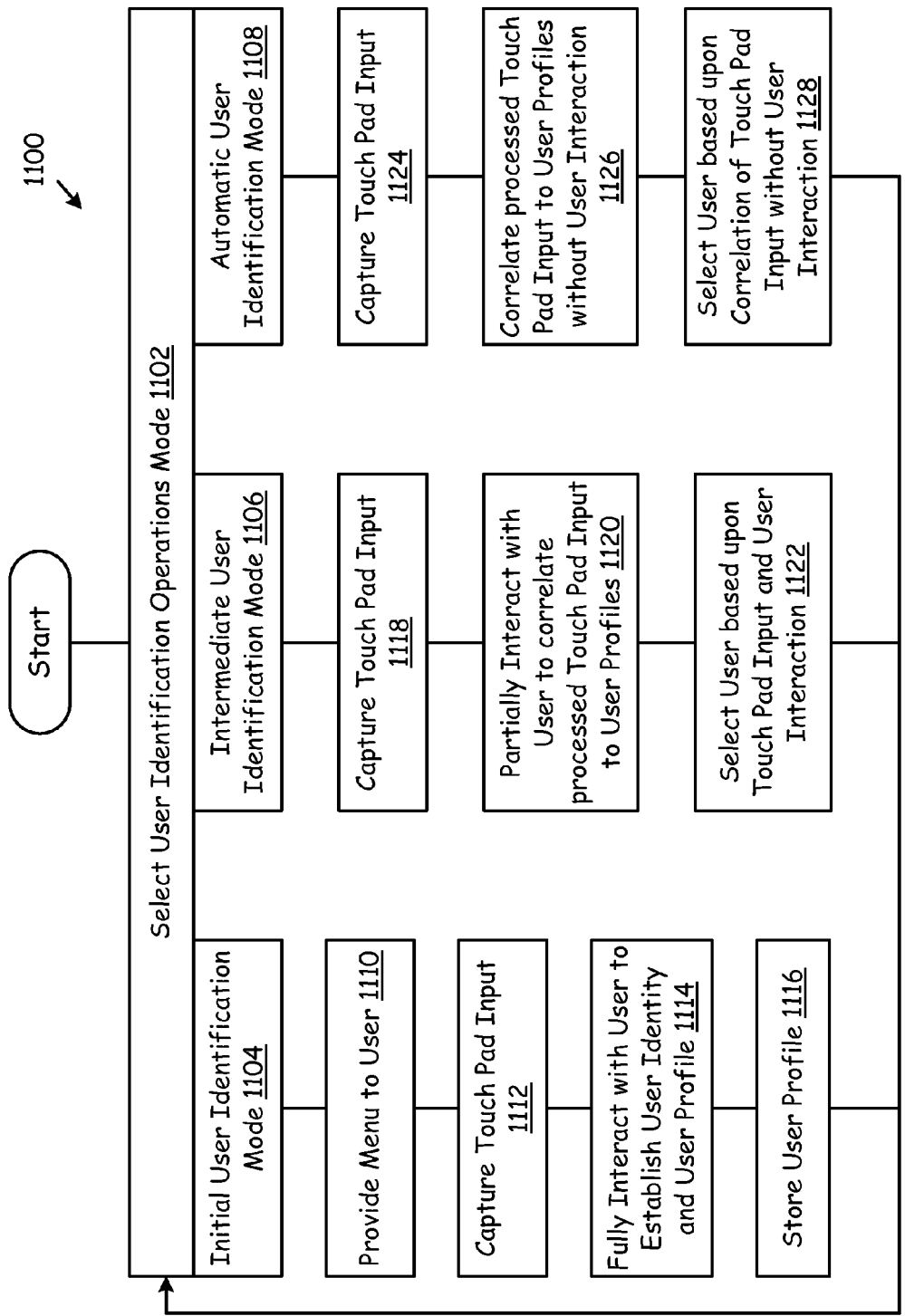
FIG. 11 is a flowchart illustrating multiple modes of user identification operations of a remote control and multimedia system console according to one or more embodiments of the present invention.

FIG. 11 is a flowchart illustrating multiple modes of user identification operations of a remote control and multimedia system console according to one or more embodiments of the present invention. Operations 1100 begin when a user identification operations mode is selected, step 1102. When selecting initial user identification mode, step 1104, a menu is provided to a user, step 1110. The menu allows the user to select a name and, optionally, other user profile data, such as age, weight, height, favorite multimedia system settings, favorite programming, etc. Touch pad input is then captured and processed to determine finger/hand characteristics, step 1112. User identity and user preference profile/user preference data is established after fully interacting with the user, step 1114. The user profile is stored, step 1116, and the process returns to the step of user identification operations mode selection, step 1102. The user profile includes a user ID, user multimedia system preferences, user touch pad characteristics, e.g., finger characteristics, heat transfer characteristics, pulse characteristics, motion characteristics, etc., and user preferences, e.g., multimedia system preferences, etc.

When intermediate user identification mode is selected, step 1106, touch pad input is captured, step 1118. The system partially interacts with the user to correlate processed touch pad input to user profiles, step 1120. A user is selected based upon touch pad input and user interaction, step 1122. Such partial interaction may query the user to indicate that a correct user ID was selected based upon finger/hand characteristics, for example. However, the extent of user interaction is much less than that of the initial user identification mode 1104.

When automatic user identification mode is selected, step 1108, touch pad input is captured, step 1124. The system correlates the processed touch pad input to user profiles without user interaction, step 1126. User is selected based upon only the touch pad input and user profiles, without additional user interaction, step 1128. Thus, with the operations beginning at step 1108 no user interaction is required.

Figure 12:
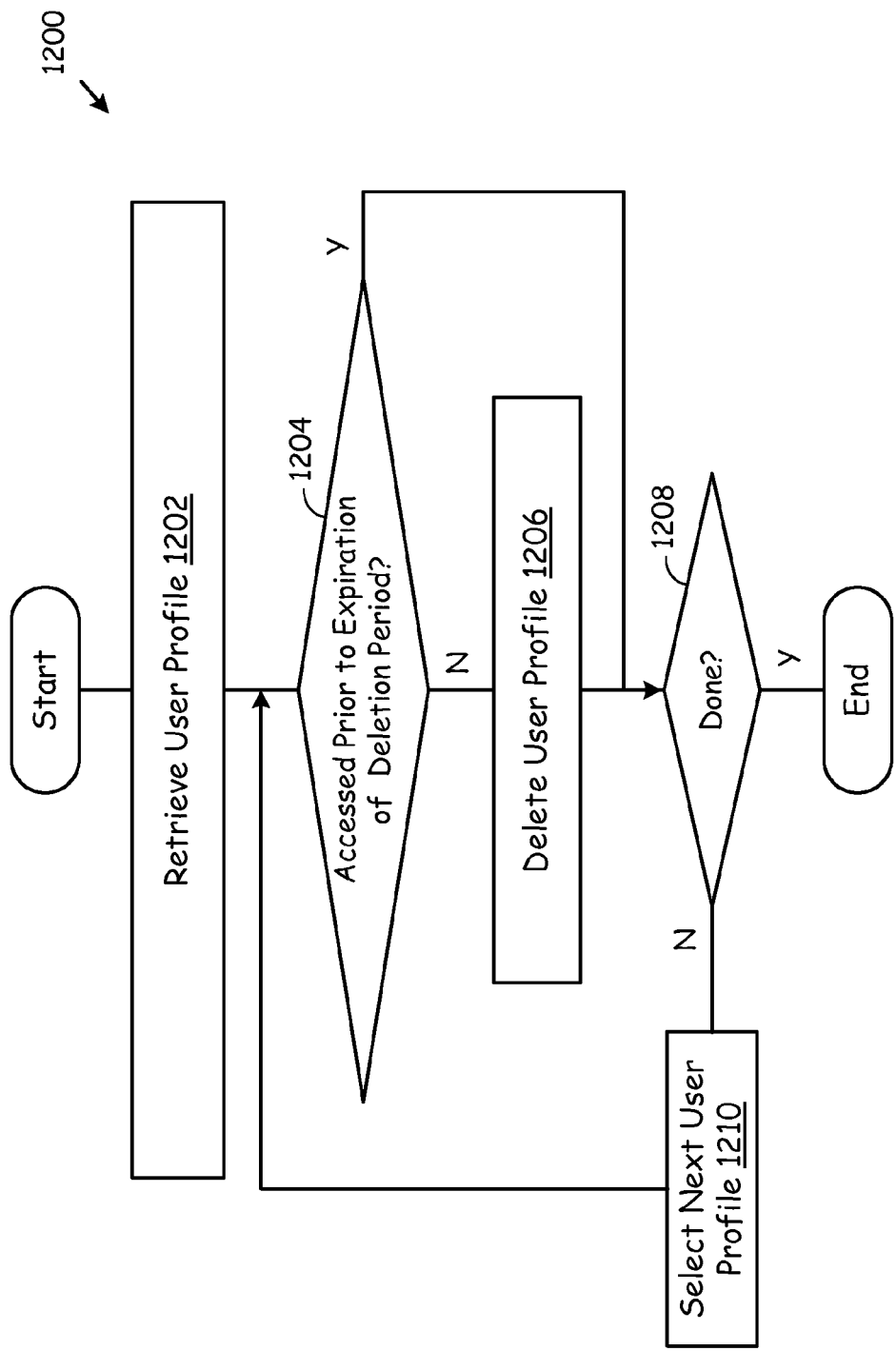
FIG. 12 is a flowchart illustrating the operation of a remote control and/or multimedia system console in deleting non-matched users after expiration of a user identification period according to one or more embodiments of the present invention.

FIG. 12 is a flowchart illustrating the operation 1200 of a remote control and/or multimedia system console in deleting non-matched users after expiration of a user identification period according to one or more embodiments of the present invention. Operations 1200 begin when a user profile is retrieved, step 1202. A determination is made regarding whether the user profile has been accessed prior to expiration of a deletion period, step 1204. If No is determined at step 1204, the user profile is deleted for the particular user, step 1206. If Yes at step 1204, the user profile has been accessed prior to expiration of deletion period and the user profile is not deleted. From both a Yes determination at step 1204 and after step 1206, a determination is made regarding whether the process is complete, step 1208. If a Yes determination is made at step 1208, the process ends. If No, the next user profile is selected, step 1210, and the process repeats to the determination step 1204.

Figure 13:
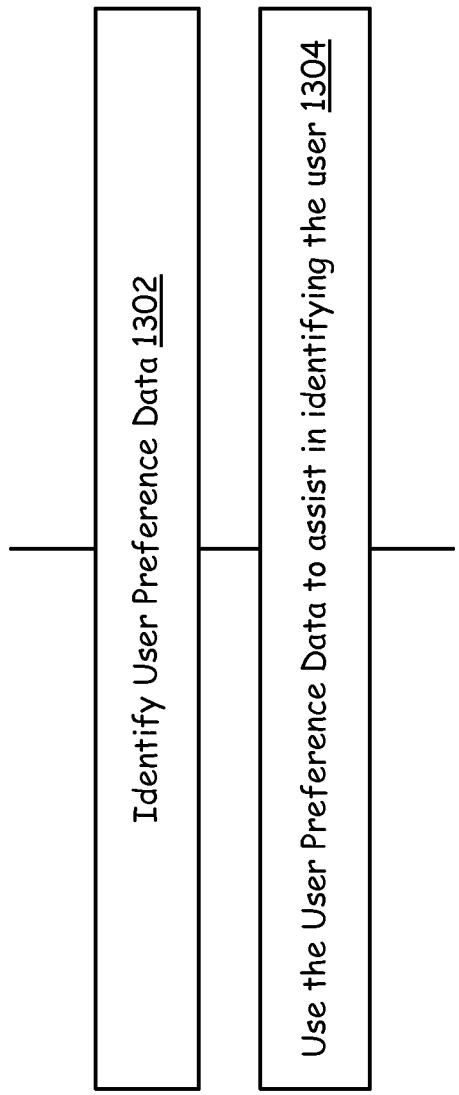
FIG. 13 is a flowchart illustrating the use of user preference data to assist in identifying a user by a multimedia system according to one or more embodiments of the present invention.

FIG. 13 is a flowchart illustrating the use of user preference data to assist in identifying a user by a multimedia system according to one or more embodiments of the present invention. User preference data is identified at step 1302. The user preference information includes multimedia system selection preferences, multimedia system setting preferences, time of day, day of week, multimedia system play duration, multimedia system usage level, channel selection preferences, and channel surfing preferences. The user preference data is used to assist in identifying the user by comparing current multimedia system operations and/or other pertinent information to the user preference data, step 1304. For example, for one particular video multimedia system, only one or two particular users may be common users for the currently selected channel. Thus, at step 1304, only those two users may be prime candidates for pattern matching of finger/hand characteristics. As another example, some users may be common active during particular hours of the day and these users are favored for pattern matching during those hours of the day.

The operations described with reference to FIGS. 8-13 may be performed by the remote control and/or a combination of the remote control and the multimedia system console.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A method for operating a remote control of a multimedia system to identify a user, the method comprising:
   receiving touch pad input from at least one touch sensitive element of the remote control that has a plurality of touch sensitive elements, the touch pad input corresponding to the user's touch of at least some of the plurality of touch sensitive elements;
   at least partially processing the touch pad input by processing circuitry of the remote control;
   transmitting the at least partially processed touch pad input to a multimedia system via a communications interface of the remote control for processing of the at least partially processed touch pad input to identify the user via pattern recognition; and alter user identification operations for:
initial user identification operations with which full user identification verification is required;
intermediate user identification operations with which partial user identification verification is required; and
automatic user identification operations without requiring user identification verification.

2. The method of claim 1, further comprising altering settings of the remote control based upon an identity of the user.

3. The method of claim 1, further comprising:
receiving a settings alteration direction from the multimedia system via the communications interface; and
altering settings of the remote control based upon the settings alteration direction.

4. The method of claim 1, wherein at least partially processing the touch pad input by processing circuitry of the remote control is selected from the group consisting of:
identifying at least one finger orientation based upon the touch pad input;
identifying at least one finger spacing based upon the touch pad input;
identifying at least one finger width based upon the touch pad input;
identifying a plurality of finger knuckle/joint locations based upon the touch pad input; and
identifying a plurality of finger lengths based upon the touch pad input.

5. The method of claim 1, wherein at least partially processing the touch pad input by processing circuitry of the remote control comprises determining at least one of heat transfer characteristics and pulse rate characteristics of a user's fingers based upon the touch pad input.

6. The method of claim 1, further comprising:
receiving voice data from a microphone of the remote control; and
transmitting the voice data to the multimedia system via the communications interface of the remote control for processing to assist in identifying the user.

7. A remote control comprising:
a communications interface;
at least one touch sensitive element having a plurality of touch sensitive elements; and
processing circuitry coupled to the communications interface and to the at least one touch sensitive element, the processing circuitry is operable to:
receive touch pad input from the at least one touch sensitive element, the touch pad input corresponding to the user's touch of at least some of the plurality of touch sensitive elements;
at least partially process the touch pad input by processing circuitry of the remote control; and
transmit the at least partially processed touch pad input to a multimedia system via the communications interface for processing to identify the user via pattern recognition of the at least partially processed touch pad input; and
alter user identification operations for:
initial user identification operations with which full user identification verification is required;
intermediate user identification operations with which partial user identification verification is required; and
automatic user identification operations without requiring user identification verification.

8. The remote control of claim 7, wherein the processing circuitry is further operable to alter its settings based upon an identity of the user.

9. The remote control of claim 7, wherein the processing circuitry is further operable to:
receive a settings alteration direction from the multimedia system via the communications interface; and
alter its settings based upon the settings alteration direction.

10. The remote control of claim 7, wherein in at least partially processing the touch pad input, the processing circuitry is operable to perform operations selected from the group consisting of:
identify at least one finger orientation based upon the touch pad input;
identify at least one finger spacing based upon the touch pad input;
identify at least one finger width based upon the touch pad input;
identify a plurality of finger knuckle/joint locations based upon the touch pad input; and
identify a plurality of finger lengths based upon the touch pad input.

11. The remote control of claim 7, wherein in at least partially processing the touch pad input, the processing circuitry is operable to determine at least one of heat transfer characteristics and pulse rate characteristics of a user's fingers based upon the touch pad input.

12. The remote control of claim 7, wherein in at least partially processing the touch pad input, the processing circuitry is operable to determine pulse rate characteristics of a user's fingers based upon the touch pad input.

13. The remote control of claim 7, wherein the processing circuitry is further operable to:
receive motion data from a motion detector of the remote control; and
transmit the motion data to the multimedia system via the communications interface for processing to assist in identifying the user.

14. The remote control of claim 7, wherein the processing circuitry is further operable to:
receive voice data from a microphone of the remote control; and
transmit the voice data to the multimedia system via the communications interface for processing to assist in identifying the user.

15. A method for operating a multimedia system to identify a user, the method comprising:
receiving touch pad input from a remote control via a communications interface, the touch pad input captured by at least one touch sensitive element of the remote control that has a plurality of touch sensitive elements, the touch pad input corresponding to the user's touch of at least some of the plurality of touch sensitive elements;
processing the touch pad input to identify the user via pattern recognition based upon user finger characteristics; and
altering operation of the multimedia system based upon the user identification; and
altering user identification operations for:
initial user identification operations with which full user identification verification is required;
intermediate user identification operations with which partial user identification verification is required; and
automatic user identification operations without requiring user identification verification.

16. The method of claim 15, further comprising:
preparing a settings alteration direction based upon the user identification; and
transmitting the settings alteration direction to the remote control via the communications interface.

17. The method of claim 15, wherein the user finger characteristics are selected from the group consisting of:
   at least one finger orientation;
   at least one finger spacing;
   at least one finger width;
   a plurality of finger knuckle/joint locations; and
   a plurality of finger lengths.

18. The method of claim 15, further comprising:
determining at least one of heat transfer characteristics and pulse rate characteristics of a user's fingers based upon the touch pad input; and
using at least one of the heat transfer characteristics and the pulse rate characteristics to assist in identifying the user.

19. The method of claim 15, further comprising:
receiving motion data from a motion detector of the remote control via the communications interface; and
using the motion data to assist in identifying the user.

20. The method of claim 15, further comprising:
receiving voice data from a microphone of the remote control via the communications interface; and
using the voice data to assist in identifying the user.

21. The method of claim 15, further comprising deleting non-matched users after expiration of a user identification deletion period.

22. The method of claim 15, further comprising using user preference information to identify the user, the user preference information including program selection, time of day, day of week, and channel surfing frequency.

23. A multimedia system comprising:
   a communications interface; and
   processing circuitry coupled to the communications interface, the processing circuitry operable to:
      receive touch pad input from a remote control via the communications interface, the touch pad input captured by at least one touch sensitive element of the remote control that has a plurality of touch sensitive elements, the touch pad input corresponding to the user's touch of at least some of the plurality of touch sensitive elements;
      process the touch pad input to identify the user via pattern recognition based upon user finger characteristics;
      alter operations of the multimedia system based upon the user identification; and
      alter user identification operations for:
         initial user identification operations with which full user identification verification is required;
         intermediate user identification operations with which partial user identification verification is required; and
         automatic user identification operations without requiring user identification verification.

24. The multimedia system of claim 23, wherein the processing circuitry is further operable to
   prepare a settings alteration direction based upon the user identification; and
   transmit the settings alteration direction to the remote control via the communications interface.

25. The multimedia system of claim 23, wherein the user finger characteristics are selected from the group consisting of:
   at least one finger orientation;
   at least one finger spacing;
   at least one finger width;
   a plurality of finger knuckle/joint locations; and
   a plurality of finger lengths.

* * * * *